(12) United States Patent
Yoon

(10) Patent No.: US 8,304,502 B2
(45) Date of Patent: Nov. 6, 2012

(54) COPOLYMER COORDINATION COMPOUND COMPRISING HETEROGENEOUS COMPLEXES AND GEL USING THE SAME

(75) Inventor: Sung Ho Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 222 days.

(21) Appl. No.: 12/071,178

(22) Filed: Feb. 15, 2008

(65) Prior Publication Data

US 2008/0200618 A1   Aug. 21, 2008

(30) Foreign Application Priority Data

Feb. 16, 2007  (KR) .................. 10-2007-0016472

(51) Int. Cl.
  *C08F 4/42*  (2006.01)
(52) U.S. Cl. ......... 526/92; 526/90; 428/312.2; 428/389; 428/689; 556/1; 528/277

(58) Field of Classification Search .................... 526/90; 556/1; 524/133, 135; 528/277, 279, 281, 528/283, 285; 427/301; 428/304.4, 306.6, 428/307.3, 307.7, 312.2, 364, 367, 389, 408, 428/689; 525/50
See application file for complete search history.

(56) References Cited

U.S. PATENT DOCUMENTS

2009/0011002 A1* 1/2009 Zabicky et al. ............... 424/450

FOREIGN PATENT DOCUMENTS

| JP | 2005-075870 | 3/2005 |
| KR | 10-2006-0004162 | 1/2006 |
| KR | 10-2008-0032785 | 4/2008 |
| WO | WO 2006/072943 | * 7/2006 |

* cited by examiner

*Primary Examiner* — Frances Tischler
(74) *Attorney, Agent, or Firm* — McKenna Long & Aldridge LLP

(57) ABSTRACT

Disclosed is a copolymer coordination compound including two or more kinds of complexes, and a method of preparing the same. Herein, each of the complexes includes an organic ligand and a metal ion, and the two or more kinds of complexes are arranged in a line in a regular or irregular order, and are coordinated to each other. Also, the disclosed copolymer coordination compound functions as a gelator in a solvent, and is formed into a gel.

11 Claims, 5 Drawing Sheets

COPOLYMER COORDINATION COMPOUND COMPRISING HETEROGENEOUS COMPLEXES AND GEL USING THE SAME

This application claims the benefit of the filing date of Korean Patent Application No. 10-2007-0016472, filed on Feb. 16, 2007, in the Korean Intellectual Property Office, the disclosure of which is incorporated herein in its entirety by reference.

BACKGROUND OF THE INVENTION (a) Field of the Invention

The present invention relates to a copolymer coordination compound comprising heterogeneous complexes, and preparation of a gel using the same.

(b) Description of the Related Art

It was reported that polymers or lipids in the shape of a rod, a wire, or a ribbon plate function as a gelator at an appropriate concentration, and thus are formed into a gel.

However, there is little published research upon formation of an organogel by using a gelator including a metal complex. Also, most polymer coordination compounds including metal complexes are simply formed in a structure of a rod, a wire, or a ribbon plate, and are precipitated without being formed into a gel. Typically, silver carboxylate is known to be able to generate a rod-type material, but is not known to be able to generate a gel.

Accordingly, it is difficult to use a conventional polymer coordination compound as a gelator. In addition, the conventional polymer coordination compound has a problem in that a gelator function of the compound occurs only at a very high concentration.

SUMMARY OF THE INVENTION

Therefore, the present invention has been made in view of the above-mentioned problems. It is an object of the present invention to provide a new type of copolymer coordination compound in which two or more kinds of polymer coordination compounds are recombined, each of the polymer coordination compounds not functioning as a gelator at a low concentration, and a method of preparing the same. Herein, the copolymer coordination compound includes two or more kinds of complexes, and may be formed into a gel, even at a low concentration, because the copolymer coordination compound can be used as a good gelator. Also, the copolymer coordination compound has a tailored function which does not occur in one kind of polymer coordination compound.

Also, the present invention provides a gel prepared using the copolymer coordination compound.

According to an aspect of the present invention, there is provided a copolymer coordination compound including two or more kinds of complexes. Herein, each of the complexes includes an organic ligand and a metal ion, and the two or more kinds of complexes are arranged in a line in a regular or irregular order, and are coordinated to each other.

In accordance with another aspect of the present invention, there is provided a gel which is prepared using the copolymer coordination compound functioning as a gelator in a solvent.

In accordance with a further aspect of the present invention, there is provided a method of preparing a copolymer coordination compound includes the steps of: mixing two or more kinds of polymer coordination compounds with a solvent, each of the polymer coordination compounds including one kind of coordinated complexes including an organic ligand and a metal ion; forming the mixture into monomer complexes not including a coordinate bond through heating, light irradiation, or microwave irradiation; and arranging the two or more kinds of complexes in a line in an alternate or irregular order by stopping the application of heating, light irradiation, or microwave irradiation, and thus coordinating the complexes to each other, thereby preparing a copolymer coordination compound.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in detail to the exemplary embodiments of the present invention.

In the present invention, a polymer coordination compound is formed through an interaction (specifically, a coordinate bond) of complexes including a metal ion and an organic ligand (preferably, homogeneous complexes in which an organic ligand is coordinated to a metal ion). In other words, the polymer coordination compound according to the present invention refers to a sort of a polymer complex compound. Also, in the present invention, a copolymer coordination compound is formed through a coordinate bond of two or more kinds of different (that is, heterogeneous) complexes (not one kind of complexes), and refers to a sort of a polymer complex compound.

Contrary to a general organic polymer formed through a covalent bond of organic monomers, a polymer coordination compound and a copolymer coordination compound according to the present invention are formed through a coordinate bond of complexes acting like monomers. Herein, each of the complexes includes a metal and an organic ligand. Therefore, it can be said that each of the polymer coordination compound and the copolymer coordination compound is a sort of a coordination polymer.

In the coordinate bond of the polymer coordination compound and the copolymer coordination compound, an organic ligand may be coordinated to two or more metal ions, and each of the coordinated metal ions may be coordinated to one or more different organic ligands in a chain-like manner.

Specifically, the coordination bonds are performed in a chain-like manner where an organic ligand of a first complex is coordinated to a metal ion of an adjacent second complex as well as a metal ion of the first complex, and the metal ion of the second complex is coordinated to an organic ligand of a third complex. In this manner, chain-like coordination bonds of complexes may form a polymer structure, that is, a polymer coordination compound or a copolymer coordination compound, and herein, the polymer coordination compound or the copolymer coordination compound may be in the shape of a rod, a wire, or a ribbon plate.

Figure 1:
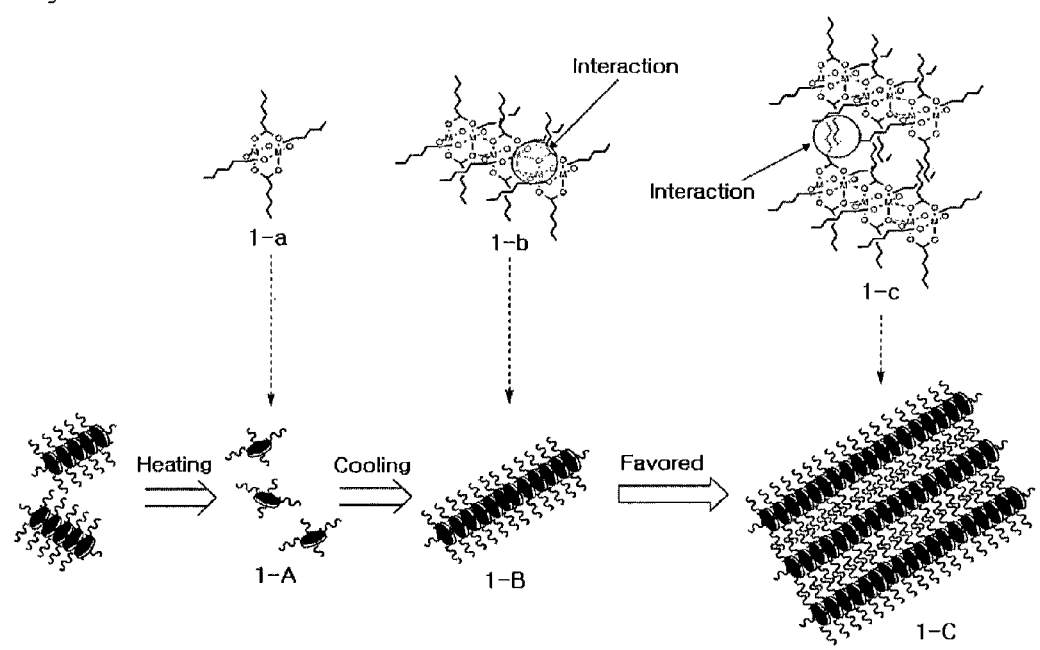
FIG. 1 illustrates a structure and a configuration of a conventional polymer coordination compound including one kind of complex.

Referring to FIG. 1, as shown in 1-b, there is an interaction (preferably, a coordinate bond) between one kind of complexes, thereby forming a polymer coordination compound. Also, as shown in 1-c, there is another interaction (preferably, a hydrophobic interaction) between formed polymer coordination compounds. Specifically, between organic ligands of one polymer coordination compound and different organic ligands of another polymer coordination compound, a hydrophobic interaction may occur. Accordingly, such interactions may appropriately occur in the entire of polymer coordination compounds in the shape of rods, wires, or ribbon plates. However, such polymer coordination compounds are formed into a very large polymer coordination compound structure 1-c in the shape of a rod, a wire, or a ribbon plate, through self-assembly processes, and thus are formed into turbid liquid, or a precipitate. Therefore, it is difficult to use the polymer coordination compounds as a gelator at a low concentration.

Also, as shown in FIG. 1, when an external change (such as heating, light irradiation, or microwave irradiation) is applied onto a polymer coordination compound, complexes included in the polymer coordination compound are separated into complex units 1-A like monomers before polymerization, by the release of coordinate bonds therebetween. However, when the external change is removed from the above state, coordinate bonds are formed again between the separated complex units, and the complexes are assembled into a polymer, thereby again forming a polymer coordination compound 1-B. The re-formed polymer coordination compounds as described above are self-assembled into a polymer coordination compound structure 1-C of a size larger than that of each polymer coordination compound, through interactions therebetween. In the result, the polymer coordination compounds are formed into a gel only at a high concentration of more than 2 wt %, or else may be formed into a precipitate instead of a gel.

For example, Ag(stearate), which is a polymer coordination compound in the shape of a rod, was added to toluene, thereby preparing turbid liquid of a relatively high concentration of about 5 wt %. Next, the solution was heated to 100° C., and then, was gradually cooled to room temperature. Then, the change in the shape of the coordination compound was observed. In macroscopic observation, the coordination compound changed like a gel (although the coordination compound was not transparent), but in TEM analysis, a long rod-shaped structure with a micro-sized width was observed. Also, when Ag(Hexanoate) or Ag(Palmitate) was used, Ag(Hexanoate) or Ag(Palmitate) was not completely dissolved by heating, and rods, instead of a gel, were precipitated in cooling.

On the other hand, in a copolymer coordination compound according to the present invention, heterogeneous complexes are coordinated to each other, thereby minimizing the above described interaction between polymer coordination compounds including homogeneous complexes. Accordingly, the copolymer coordination compound according to the present invention functions as a gelator even at a low concentration, and thus may easily be formed into a gel.

Figure 2:
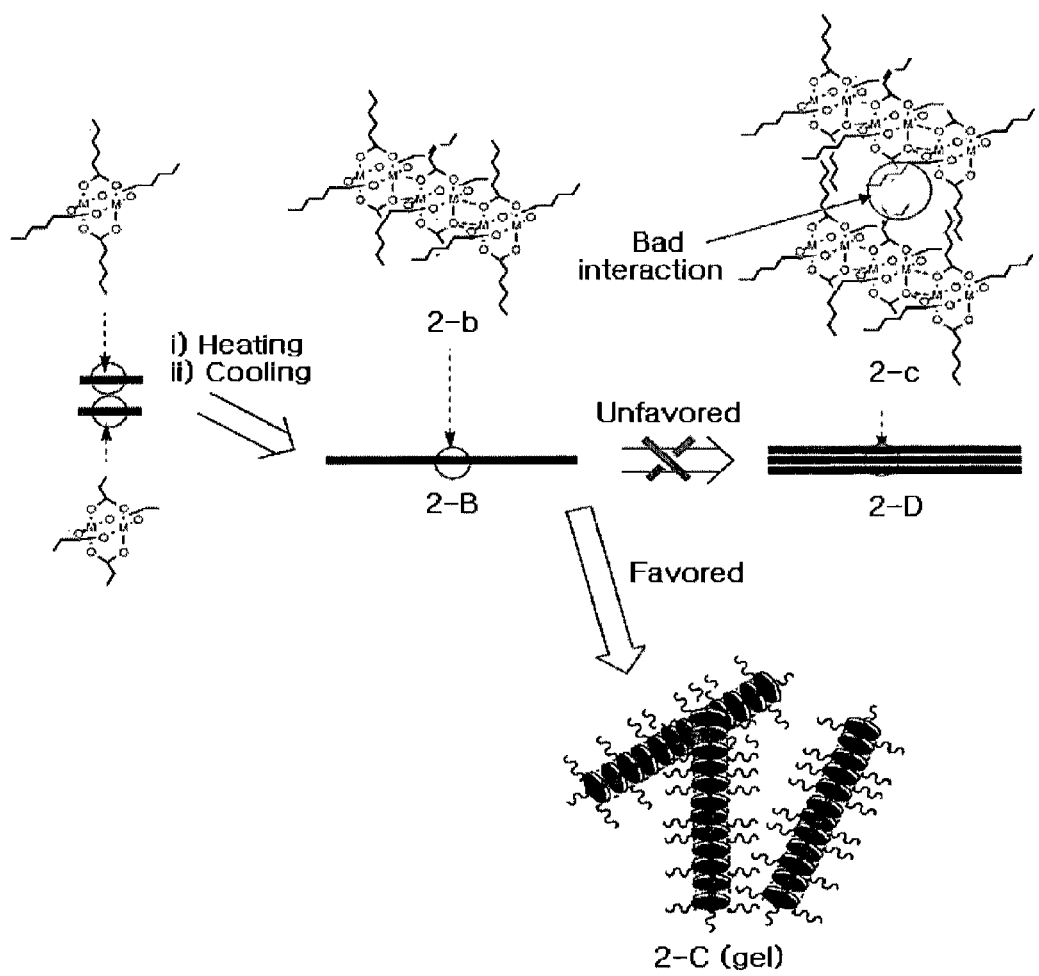
FIG. 2 illustrates a structure and a configuration of a copolymer coordination compound according to the present invention.

Specifically, referring to FIG. 2, a copolymer coordination compound 2-b and 2-B according to the present invention includes two or more kinds of complexes, each of the complexes including an organic ligand and a metal ion. Herein, the two or more kinds of complexes are arranged in a line in a regular or irregular order, and are coordinated to each other. In the two or more kinds of complexes, an organic ligand and/or a metal included in one complex are/is different from that of another complex (for example, two or more different kinds of complexes, such as a first complex including an organic ligand and a metal ion, a second complex including another organic ligand and/or another metal ion, etc.).

In the above described copolymer coordination compound according to the present invention, in which heterogeneous complexes are alternately or irregularly arranged in a line and are coordinated to each other, a length from a core of a metal ion to the end of an organic ligand coordinated to the metal ion varies according to different complexes.

Accordingly, there exists a stepped surface in the copolymer coordination compound according to the present invention, thereby preventing the interaction, that is, a hydrophobic interaction, (as shown in 1-c of FIG. 1) between such copolymer coordination compounds 2-c. Therefore, the copolymer coordination compound according to the present invention functions as a gelator even at a low concentration, and thus may easily be formed into a gel as shown in 2-C of FIG. 2, instead of growing into a structure 2-D similar to the above described polymer coordination compound structure 1-C in the shape of a rod, a wire, or a ribbon plate of a larger size.

A method of preparing the copolymer coordination compound according to the present invention includes the steps of: mixing two or more kinds of polymer coordination compounds with a solvent, each of the polymer coordination compounds including one kind of coordinated complexes including an organic ligand and a metal ion;

forming the mixture into monomer complexes not including a coordinate bond through heating, light irradiation, or microwave irradiation; and arranging the two or more kinds of complexes in a line in an alternate or irregular order by stopping the application of heating, light irradiation, or microwave irradiation, and thus coordinating the complexes to each other, thereby preparing a copolymer coordination compound.

In the preparation, no particular limitation is imposed on the solvent employed in the reaction. Non-limiting examples of the solvent include toluene, benzene, THF, hexane, acetonitrile, xylene, alkyl amine, etc., and also, a mixture of at least two of these materials may be used. Also, the mixing ratio of a complex and a solvent is not particularly limited.

Also, in the preparation, it is preferable that the temperature of the heating is lower than the boiling point of a used solvent, and at the same time, is lower than a temperature where a complex is decomposed.

In the present invention, the organic ligand may include both a hydrophilic group and a hydrophobic group.

Herein, the hydrophilic group may include at least one kind of group selected from the group including —COO, —NH$_2$, —CONH$_2$, —PO$_3$H$_2$, —SH, —SO$_3$H, —SO$_2$H, —NO$_2$, and —O(CH$_2$CH$_2$O)$_n$H (n represents an integer between 1 and 5), and the hydrophobic group may include at least one kind of group selected from the group including a C$_3$~C$_{30}$ alkyl group and a C$_3$~C$_{30}$ aryl group. Since the organic ligand has both a hydrophilic group and a hydrophobic group, a complex according to the present invention may include a structure where a hydrophilic group of an organic ligand is coordinated to a metal ion.

In the present invention, the metal ion is not particularly limited as long as the metal ion can form the previously described polymer coordination compound through a coordinate bond with an organic ligand. The metal ion may include an ion of at least one kind of metal selected from the group including, but not limited to, silver (Ag), nickel (Ni), copper (Cu), gold (Au), iron (Fe), cobalt (Co), ruthenium (Ru), rhodium (Rd) and platinum (Pt).

Hereinafter, the present invention will be explained in more detail with reference to the Examples, However, the following Examples are illustrative only, and the scope of the present invention is not limited thereto.

EXAMPLE 1

0.0300 g of Ag(palmitate) and 0.0030 g of Ag(Hexanoate) were mixed with 8 g of Toluene, and the mixture was heated at 110° C. for 5 minutes. The heated mixture was cooled to room temperature (23° C.), and then, was formed into a transparent gel.

Figure 3:
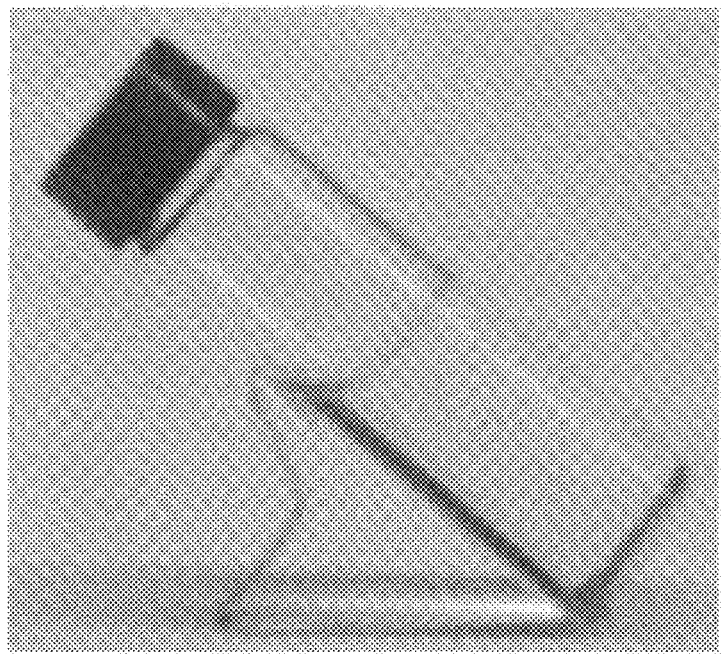
FIG. 3 is a photograph of a gel prepared according to Example 1.
Figure 4:
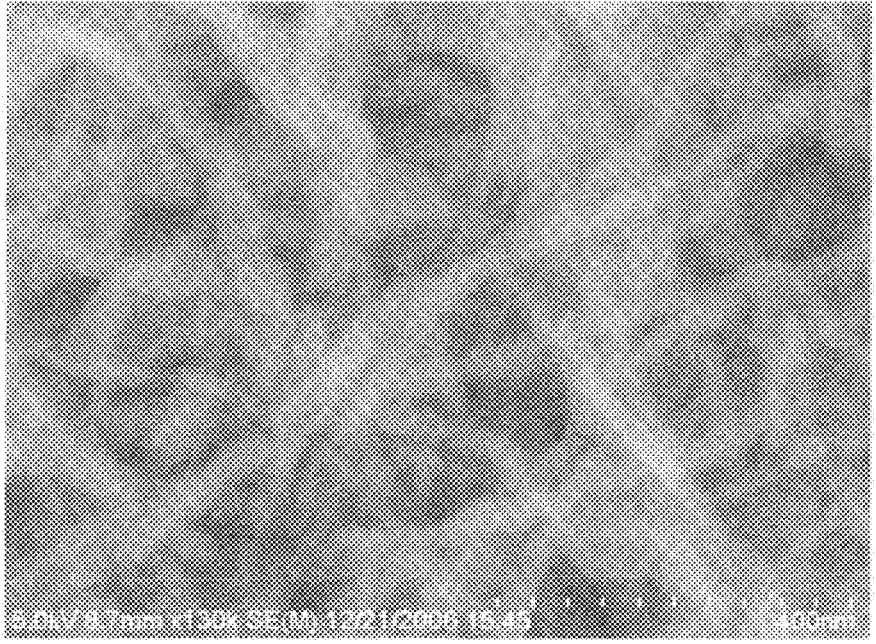
FIG. 4 is a scanning electron microscopy (SEM) photograph of a copolymer coordination compound prepared according to Example 1.

FIG. 3 is a photograph of a gel prepared according to Example 1; and FIG. 4 is a scanning electron microscopy (SEM) photograph of a copolymer coordination compound prepared according to Example 1. As shown in FIG. 4, prepared copolymer coordination compounds are in the shape of thin threads with a width of less than 20 nm, and the threads function as a gelator, thereby being formed into a gel.

EXAMPLE 2

A gel was formed in the same manner as described in Example 1, except that Ag(stearate) was used instead of Ag(Hexanoate).

EXAMPLE 3

A gel was formed in the same manner as described in Example 1, except that Ag(propionate) was used instead of Ag(Hexanoate).

COMPARATIVE EXAMPLE 1

0.0330 g of Ag(palmitate) was mixed with 8 g of Toluene, and the mixture was heated at 110° C. for 5 minutes. The heated mixture was cooled to room temperature (23° C.), and then, was formed into turbid liquid including rod-shaped structures with a micro-sized width.

Figure 5:
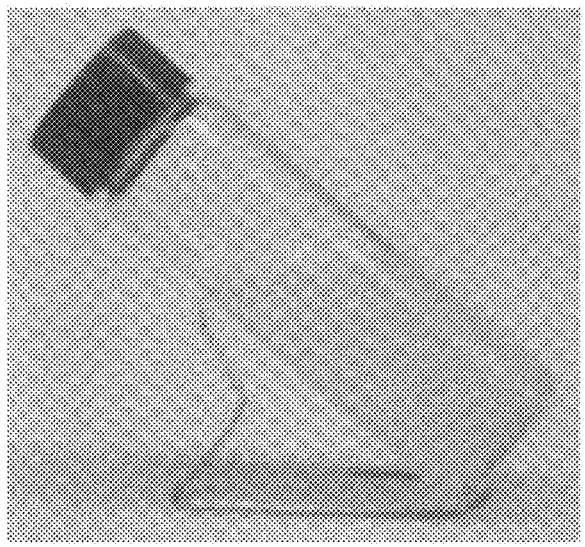
FIG. 5 is a photograph of turbid liquid prepared according to Comparative Example 1.
Figure 6:
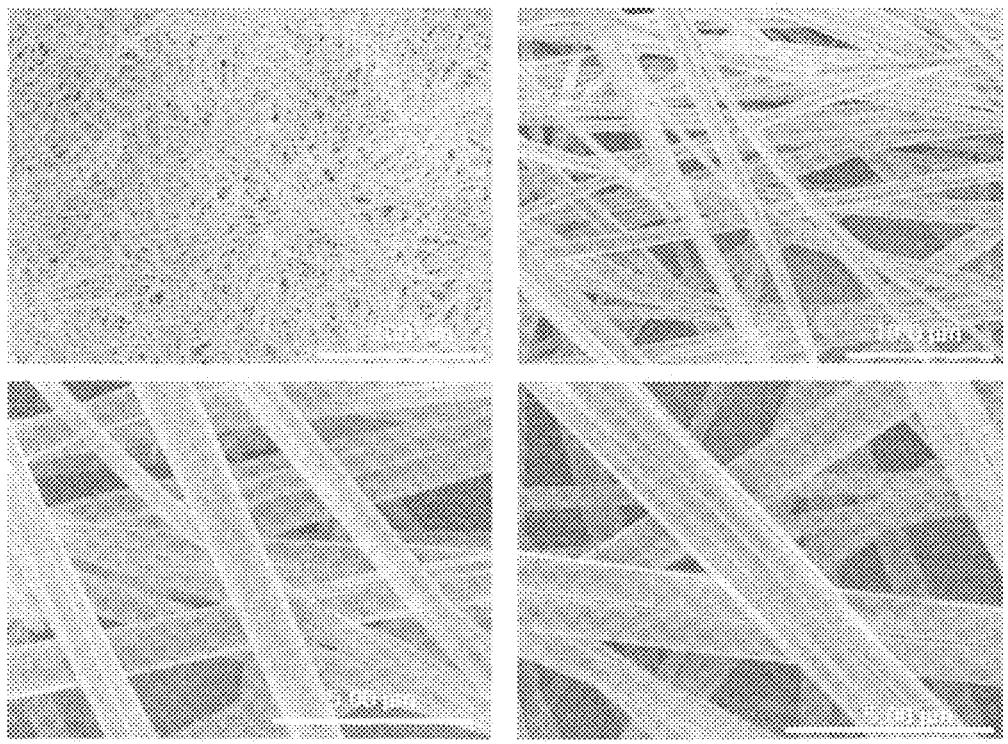
FIG. 6 is a scanning electron microscopy (SEM) photograph of a polymer coordination compound prepared according to Comparative Example 1.

FIG. 5 is a photograph of turbid liquid prepared according to Comparative Example 1; and FIG. 6 is a scanning electron microscopy (SEM) photograph of a polymer coordination compound prepared according to Comparative Example 1. As shown in FIG. 6, prepared polymer coordination compounds include rod-shaped structures with a width of about 1 μm, instead of being formed into a gel.

COMPARATIVE EXAMPLE 2

0.0330 g of Ag(hexanoate) was mixed with 8 g of Toluene, and the mixture was heated at 110° C. for 5 minutes. The heated mixture was cooled to room temperature (23° C.), and then, was formed into turbid liquid including rod-shaped structures with a micro-sized width.

Figure 7:
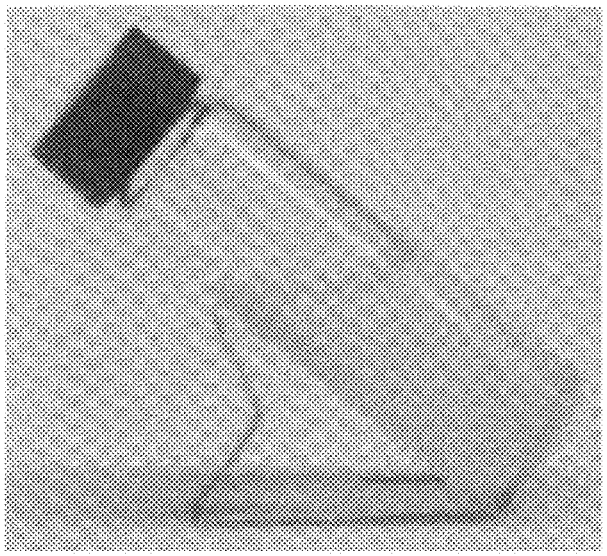
FIG. 7 is a photograph of turbid liquid prepared according to Comparative Example 2.
Figure 8:
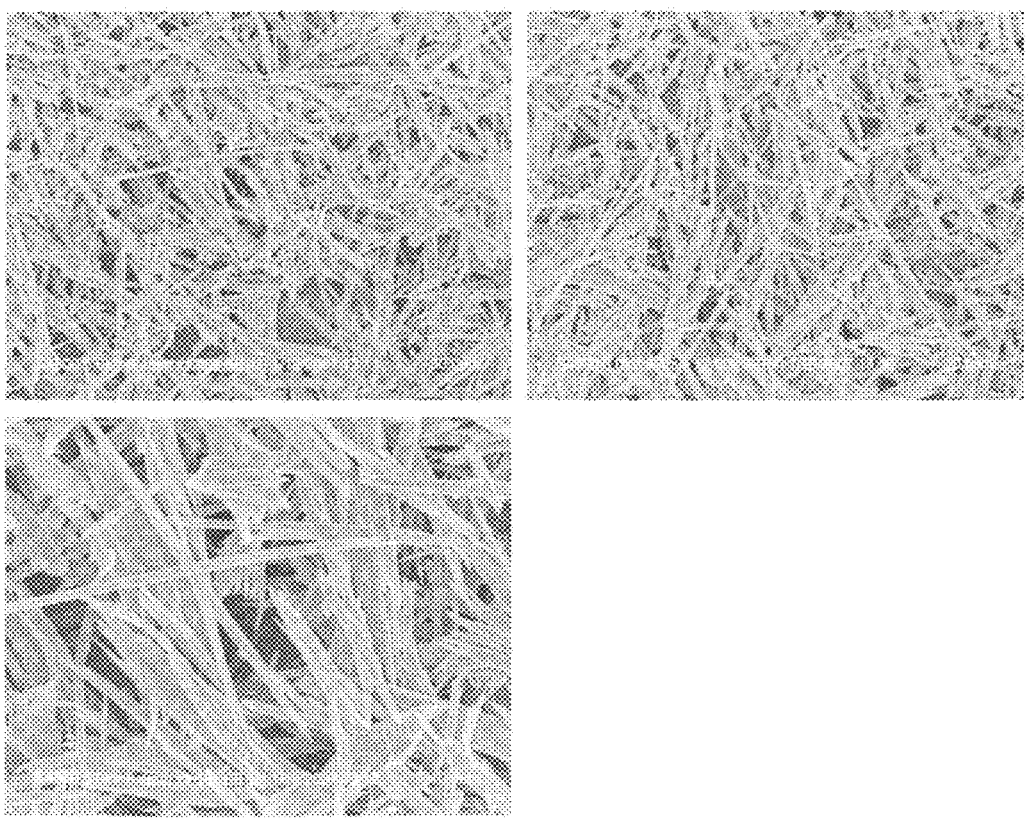
FIG. 8 is a scanning electron microscopy (SEM) photograph of a polymer coordination compound prepared according to Comparative Example 2.

FIG. 7 is a photograph of turbid liquid prepared according to Comparative Example 2; and FIG. 8 is a scanning electron microscopy (SEM) photograph of a polymer coordination compound prepared according to Comparative Example 2. As shown in FIG. 8, prepared polymer coordination compounds include rod-shaped structures with a width of about less than 1 μm, instead of being formed into a gel.

Industrial Applicability

A copolymer coordination compound according to the present invention includes coordinated heterogeneous complexes, and functions well as a gelator. Accordingly, the copolymer coordination compound according to the present invention functions as a gelator even at a low concentration, and can be formed into a gel.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

What is claimed is:

1. A gel formed by a copolymer coordination compound, the gel comprising:
    the copolymer coordination compound, and
    a solvent,
    wherein the copolymer coordination compound comprises a first complex including a metal ion and an organic ligand; and a second complex including a metal ion and an organic ligand which are different from at least one of the metal ion and the organic ligand included in the first complex;
    wherein the metal ion included in each of the first and second complex is coordinated to the organic ligand included in each of the first and second complex in a chain-like manner, and thus the first and second complex are alternately or irregularly arranged in a line,
    wherein the organic ligand coordinated to the metal ion of the first or second complex varies, and has both a hydrophilic group and a hydrophobic group,
    wherein the hydrophilic group comprises at least one selected from the group including —COO, —NH$_2$, —CONH$_2$, —PO$_3$H$_2$, —SH, —SO$_3$H, —SO$_2$H, —NO$_2$, and —O(CH$_2$CH$_2$O)$_n$H (n represents an integer between 1 and 5), and the hydrophobic group comprises at least one selected from the group including a C$_3$~C$_{30}$ alkyl group and a C$_3$~C$_{30}$ aryl group,
    wherein the metal ion comprises an ion of at least one selected from the group including silver (Ag), nickel (Ni), copper (Cu), gold (Au), iron (Fe), cobalt (Co), ruthenium (Ru), rhodium (Rd) and platinum (Pt), and
    wherein the first complex and second complex are in an amount of less than 2 wt % based on a total weight of the first complex, the second complex, and the solvent.

2. The gel as claimed in claim 1, wherein, in each of the first complex and the second-complex, the hydrophilic group of the organic ligand is coordinated to the metal ion.

3. The gel as claimed in claim 1, wherein the copolymer coordination compound functioning as a gelator in the solvent.

4. The gel as claimed in claim 3, wherein, in the coordination bond, an organic ligand is coordinated to two or more metal ions, and each of the coordinated metal ions is coordinated to one or more different organic ligands in a chain-like manner.

5. The gel as claimed in claim 3, wherein the organic ligand has both a hydrophilic group and a hydrophobic group.

6. The gel as claimed in claim 5, wherein the hydrophilic group comprises at least one selected from the group including —COO, —NH$_2$, —CONH$_2$, —PO$_3$H$_2$, —SH, —SO$_3$H, —SO$_2$H, —NO$_2$, and —O(CH$_2$CH$_2$O)$_n$H (n represents an integer between 1 and 5), and the hydrophobic group comprises at least one selected from the group including a C$_3$~C$_{30}$ alkyl group and a C$_3$~C$_{30}$ aryl group.

7. The gel as claimed in claim 3, wherein the metal ion comprises an ion of at least one selected from the group including silver (Ag), nickel (Ni), copper (Cu), gold (Au), iron (Fe), cobalt (Co), ruthenium (Ru), rhodium (Rd) and platinum (Pt).

8. The gel as claimed in claim 5, wherein, in each of the first complex and the second complex, the hydrophilic group of the organic ligand is coordinated to the metal ion.

9. A method of preparing a gel as claimed in claim 1 comprises the steps of:
mixing a first complex and a second complex with a solvent, the first complex including a metal ion and an organic ligand, and the second complex including a metal ion and an organic ligand;
forming monomer complexes through heating, light irradiation, or microwave irradiation, the monomer complexes not including a coordinate bond; and
arranging the monomer complexes in a line in an alternate or irregular order by stopping application of the heating, the light irradiation, or the microwave irradiation, and thus coordinating the monomer complexes to each other, thereby preparing the copolymer coordination compound;
wherein the organic ligand coordinated to the metal ion of the first or second complex varies, and has both a hydrophilic group and a hydrophobic group,
wherein the hydrophilic group comprises at least one selected from the group including —COO, —NH$_2$, —CONH$_2$, —PO$_3$H$_2$, —SH, —SO$_3$H, —SO$_2$H, —NO$_2$, and —O(CH$_2$CH$_2$O)$_n$H (n represents an integer between 1 and 5), and the hydrophobic group comprises at least one selected from the group including a C$_3$~C$_{30}$ alkyl group and a C$_3$~C$_{30}$ aryl group, and
wherein the metal ion comprises an ion of at least one selected from the group including silver (Ag), nickel (Ni), copper (Cu), gold (Au), iron (Fe), cobalt (Co), ruthenium (Ru), rhodium (Rd) and platinum (Pt).

10. The method as claimed in claim 9, wherein, in the coordination bond, an organic ligand is coordinated to two or more metal ions, and each of the coordinated metal ions is coordinated to one or more different organic ligands in a chain-like manner.

11. The method as claimed in claim 9, wherein, in each of the first complex and the second-complex, the hydrophilic group of the organic ligand is coordinated to the metal ion.

* * * * *